United States Patent [19]
Chen

[11] Patent Number: 6,038,730
[45] Date of Patent: Mar. 21, 2000

[54] WINDSHIELD WIPER WITH REPLACEMENT BLADE

[76] Inventor: Liang-Yuan Chen, 21392 Lemontree Ln., Huntington Beach, Calif. 92646

[21] Appl. No.: 09/131,525

[22] Filed: Aug. 10, 1998

[51] Int. Cl.[7] .................................. B60S 1/38; B60S 1/28
[52] U.S. Cl. .............................. 15/250.452; 15/250.451; 15/250.001; 15/250.44; 15/250.361
[58] Field of Search .............................. 15/250.48, 250.4, 15/250.41, 250.451, 250.452, 250.361, 250.001, 245, 250.44, 250.43

[56] References Cited

U.S. PATENT DOCUMENTS

| | | | |
|---|---|---|---|
| 2,852,798 | 9/1958 | Grossfeld | 15/245 |
| 3,961,395 | 6/1976 | Journee | 15/250.48 |
| 4,296,522 | 10/1981 | Brack | 15/245 |
| 4,336,624 | 6/1982 | Pichelman et al. | 15/250.48 |

Primary Examiner—Gary K. Graham
Attorney, Agent, or Firm—Raymond Y. Chan; David and Raymond

[57] ABSTRACT

A windshield wiper includes a wiper bridge pivotally connected with at least two claw units for mounting a flexor thereto for engaging a wiping blade. However, the flexor and the two claw units define a receiving housing therebetween for storing an additional wiping blade for selectively replacing the wiping blade. Whereby, the user may simply pull out the additional wiping blade and replace the wiping blade by engaging the additional wiping blade with an holding groove of the flexor, and that the replaced wiping blade can also be stored in the receiving housing.

18 Claims, 5 Drawing Sheets

WINDSHIELD WIPER WITH REPLACEMENT BLADE

FIELD OF THE PRESENT INVENTION

The present invention relates to vehicle wipers, and more particular to a windshield wiper adapted to store an additional wiping blade which can be specifically adapted for using in different season or used as a spare replacement blade.

BACKGROUND OF THE PRESENT INVENTION

In order to provide a better field of vision during raining or snowing weather, a pair of windshield wipers are generally installed to the vehicle windshield for continuously wiping the windshield to wipe away the rain or snow thereon when they are activated.

Conventional windshield wiper 10, as shown in FIG. 1, comprises an elongated flexor 11 to hold an elongated wiping blade 12 in position, generally a pair of claw units 13 gripped on the flexor 11, and a bridge 14 pivotally mounted between the two claw units 13. Generally, the vehicle provides a pair of windshield wiper arms 1 which are installed to a bottom side of the windshield 2, wherein one end 1a of each of the windshield wiper arms 1 is connected to a turner 2a and anther end 1b thereof is pivotally and detachably mounted to a middle position of the respective bridge 14 of the windshield wiper 10, so as to press the wiping blade 12 against the windshield 2 surface. Therefore, when the windshield wiper arm 1 is driven to swing by the turner 2a, the windshield wiper 10 is driven by the windshield wiper arm 1 to swing against the windshield 2 surface, so that the wiping blade 12 will press against the windshield surface 2 to wipe away the rain, sand, dirt, or snow thereon.

It is well known that the user of the vehicle has a duty to replace the whole windshield wiper 10 due to aging of the wiping blade 12 thereof. Due to the fact that in order to ensure the best wiping effect, the wiping blade 12 must be remained pressing against the windshield surface 2. Therefore, although the present technology can provide a kind of synthesis rubber that can resist high temperature due to sunshine, the rubber made wiping blade 12 may still lose its elastic nature after continuously bearing a pressing pressure and become aging and hardened. It is a common experience to every vehicle user that even the wiping blade 12 has not been used the whole year, it is preferred to replace a new pair windshield wipers 10 for the coming rainy or snowy season to ensure good wiping effect for security reason.

To detach or install the windshield wipers is not a hard task. However, every vehicle model has a different model of windshield wiper to be used. Therefore, most users find difficulty of purchasing the right size and design of windshield wiper to replace the old one.

Another unavoidable drawback of the conventional windshield wiper is especially obvious in those regions that have a rainy summer and a snowy winter, such as the East Coast of America. To ensure the best field of vision, the material and shape of the rubber made wiping blade 12 are different for wiping rain and wiping snow. Generally speaking, a more elastic wiping blade 12 is adapted to wipe rain and a harder and strengthened wiping blade 12 is preferred to wipe snow. It is unreasonable to install both kinds of windshield wiper for rainy and snowy days at the same time. Some users purchase both the rainy and snowy windshield wipers but who knows when is the rainy day or snowy day. When a user wakes up in a snowy morning, he or she must first to find out where is the snowy windshield wiper and replace the whole windshield wiper with specific tools. If there are more than one vehicles in a family, the user must also determine the correct kind of windshield wiper to replace.

Imagine that if there is a sudden heavy snowstorm and the original wiping blades 12 installed on the windshield are worn-out or merely for rainy day used, it is extremely danger to drive the vehicle without clear field or vision.

SUMMARY OF THE PRESENT INVENTION

It is thus a first object of the present invention to provide a windshield wiper adapted to store an additional wiping blade which can be specifically adapted for using in different season.

A further object of the present invention is to provide a windshield wiper adapted to store an additional wiping blade which can be used as a spare replacement blade.

Yet another object of the present invention is to provide a windshield wiper that takes advantage of the two claw units and the flexor thereof to define a housing for receiving the additional wiping blade therein, so that no extra element and manufacturing cost is required.

Still another object of the present invention is to provide a windshield wiper which enables a user to easily and rapidly replace the regular wiping blade with the additional wiping blade without specific skill and tools.

Still another object of the present invention is to provide a windshield wiper which further includes a protective cap for protecting the additional wiping blade when it is not used.

Accordingly, in order to accomplish the above-mentioned objects, the present invention provides a windshield wiper, comprising:

a wiper bridge having a predetermined length for pivotally connecting to a windshield wiper arm;

at least two claw units pivotally connected with the wiper bridge respectively, wherein each of the claw units comprises a claw body having a reversed U-shaped or V-shaped cross section and two pairs of U-shaped claws integrally extended from two ends of the respective claw body respectively;

an elongated flexor having two side edges which are respectively clamped by the claws of the two claw units so as to firmly mount the flexor extending between the two claw units, the flexor further having an elongated holding groove provided along a bottom side thereof, wherein a top surface of the flexor and the two reversed U-shaped claw bodies of the two claw units define a receiving housing;

a wiping blade having an elongated upper head slidably and detachably received in the holding groove of the flexor so as to mount the wiping blade in position, an additional wiping blade, which is slidably received along the receiving housing, having an identical structure of the wiping blade, wherein the additional wiping blade is placed on the top surface of the flexor and held in position by the two reversed U-shaped claw bodies, whereby the user may simply pull out the additional wiping blade and replace the wiping blade by engaging the additional wiping blade with the holding groove of the flexor, and that the replaced wiping blade can also be stored in the receiving housing; and means for holding said wiping blade and said additional wiping blade in position.

DETAILED DESCRIPTION OF THE PREFERRED EMBODIMENTS

Figure 2:
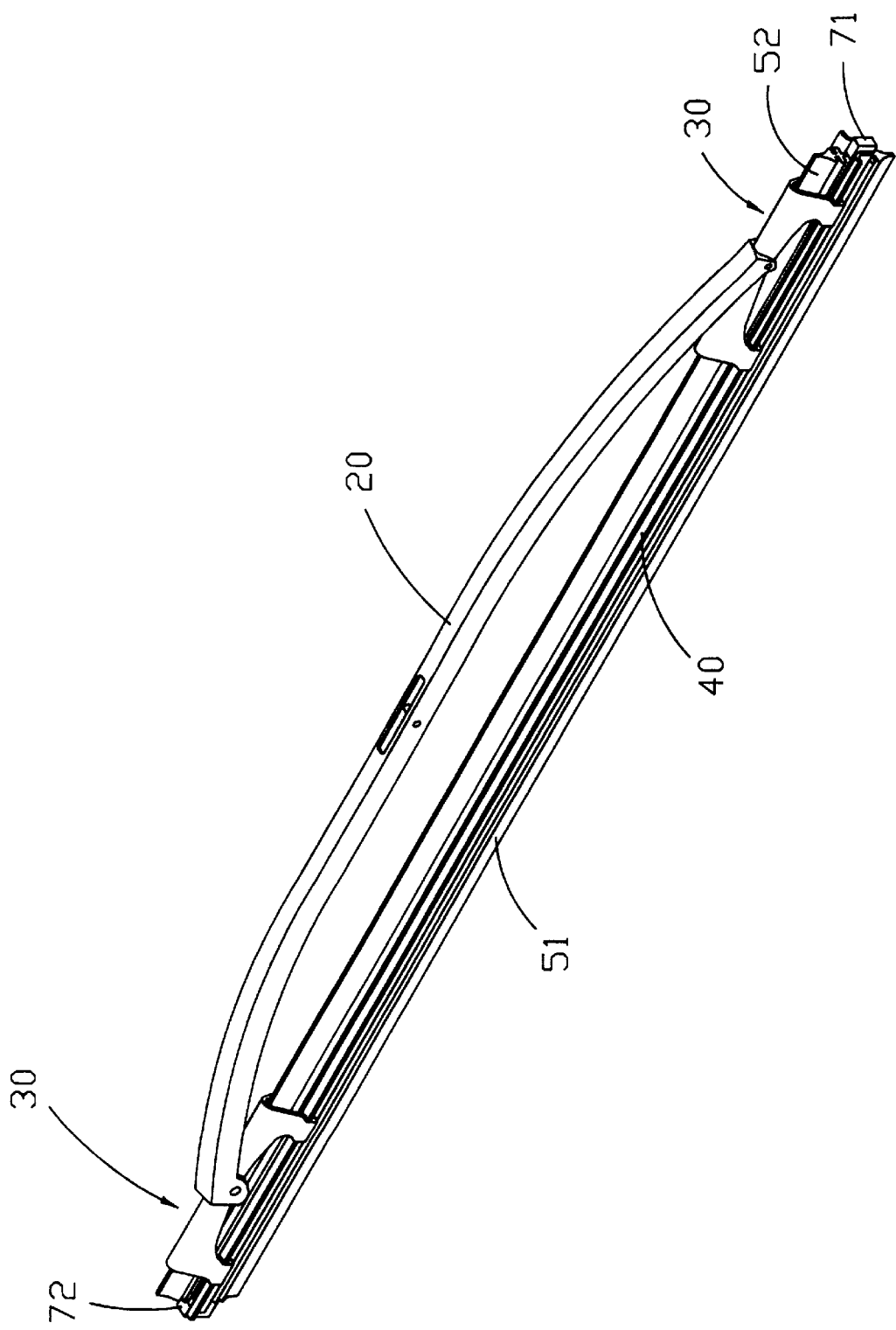
FIG. 2 is a perspective view of a windshield wiper according to a first preferred embodiment of the present invention.
Figure 3:
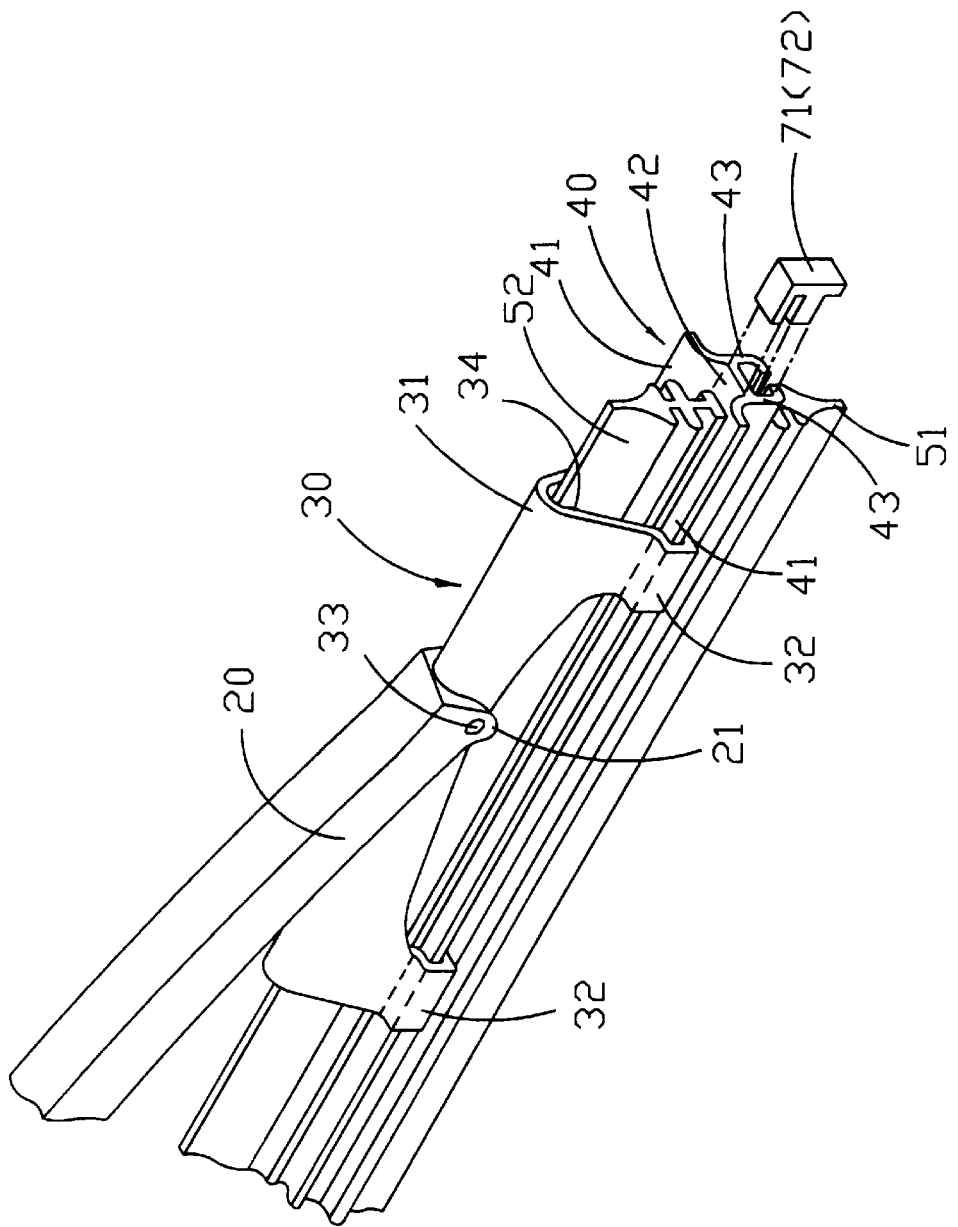
FIG. 3 is a partially enlarged perspective view of the windshield wiper according to the above first preferred embodiment of the present invention.
Figure 4:
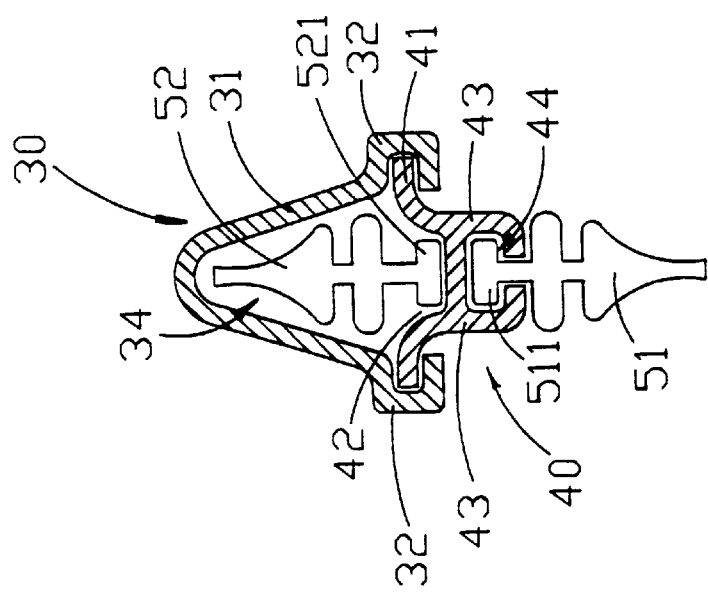
FIG. 4 is a sectional end view of the windshield wiper according to the above first preferred embodiment of the present invention.

Referring to FIGS. 2, 3 and 4, a windshield wiper according to a first preferred embodiment is illustrated, which comprises a wiper bridge 20, at least two claw units 30 pivotally connected with the wiper bridge 20, a flexor 40, a wiping blade 51, an additional wiping blade 52, and means for holding said wiping blade 51 and said additional wiping blade 52 in position.

Figure 1:
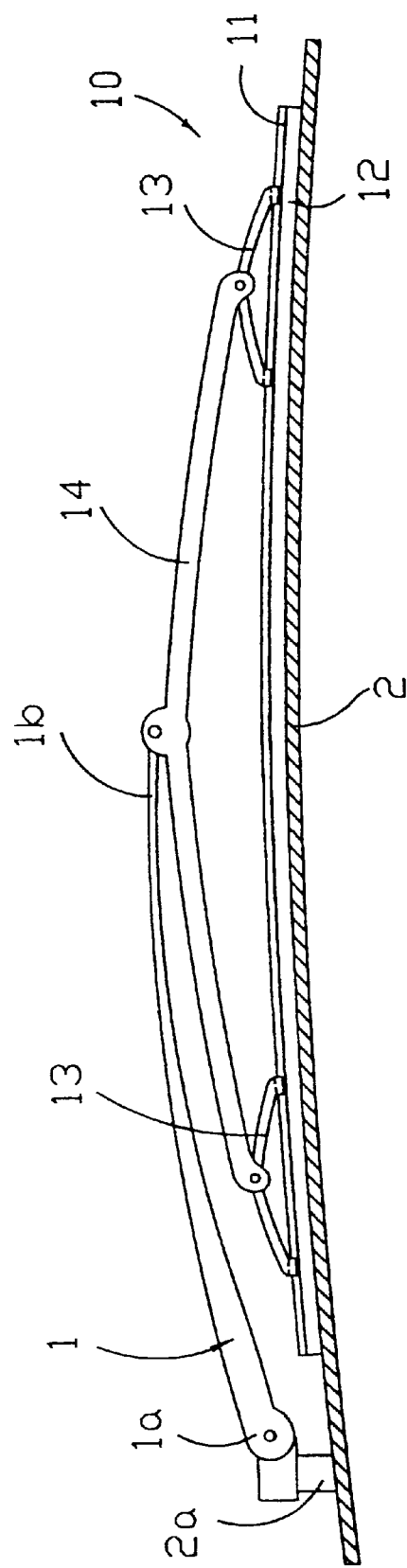
FIG. 1 is a front view of a conventional windshield wiper.

The wiper bridge 20, which comprises a configuration similar to the conventional bridge 14 as shown in FIG. 1, has a predetermined length for pivotally connecting to a windshield wiper arm 1 in a usual manner, wherein two ends of the wiper bridge 20 each forms a U-shaped end holder 21.

According to the first preferred embodiment of the present invention, the two claw units 30 each comprises a claw body 31 having a reversed U-shaped or V-shaped cross section and two pairs of U-shaped claws 32. Each pair of the claws 32 is integrally and outwardly extended from two sides of one end of the respective claw body 31 respectively. Each of the two end holders 21 of the wiper bridge 20 is pivotally connected with a middle portion of the respective claw body 31 by a rivet 33.

The elongated flexor 40 has two side edges 41, an elongated central receiving groove 42 extended along a top surface thereof, and two L-shaped bottom wings 43 downwardly extended from a bottom surface of the flexor 40 to define an holding groove 44 between the two confronting bottom wings 43. The two pairs of claws 32 of each of the claw units 30 are respectively engaged with the two side edges 41 of the flexor 40 so as to firmly mount the flexor 40 extending between the two claw units 30. The receiving groove 42 on the top surface of the flexor 40 and the two reversed U-shaped claw bodies 31 of the two claw units 30 define a receiving housing 34.

The wiping blade 51 which is generally made of rubber material has an elongated upper head 511 extended along its length. The wiping blade 51 is mounted on the flexor 40 by slidably and detachably holding the upper head 511 thereof inside the holding groove 44 of the flexor 40, wherein the size and shape of the upper head 511 are preferably slightly smaller than the size and shape of the holding groove 44 of the flexor 40, so that the upper head 511 can be slidably received inside the holding groove 44. Moreover, the user may also easily detach the wiping blade 51 from the flexor 40 by pulling out the upper head 511 along its axial direction.

The additional wiping blade 52, which has a length equal to or shorter than the flexor 40, is coaxially and fittedly received in the receiving housing 34, wherein the upper head 521 of the additional wiping blade 52 is adapted to place along the receiving groove 42 on the top surface of the flexor 40 and be held in position by the two reversed U-shaped claw bodies 31 of the pair of claw units 30.

When the additional wiping blade 52 is used as a spare blade of the wiping blade 51, the additional wiping blade 52 is identical in length, shape and material of the wiping blade 51, whereby the user may simply pull out the additional wiping blade 52 and replace the wiping blade 51 by engaging the upper head 521 of the additional wiping blade 52 with the holding groove 44 of the flexor 40.

The wiping blade 51 and the additional wiping blade 52 can be respectively designed as a rain wiping blade and a snow wiping blade. Therefore, during the rainy day, the wiping blade 51 is engaged with the flexor 40 and pressed against the windshield, wherein the additional wiping blade 52 is fittedly stored in the receiving housing 34. However, during the snowy day, the user may exchange the wiping blade 51 with the additional wiping blade 52 by pulling out from the holding groove 44 of the flexor 40 and engaging the additional wiping blade 52 with flexor 40, and then the detached wiping blade 51 can also be stored in the receiving housing 34.

The means for holding said wiping blade 51 and said additional wiping blade 52 in position, as shown in FIG. 2, comprises two stoppers 71, 72 studded at two ends of the holding groove 44 of the flexor 40 to limited the wiping blade 51 and said additional wiping blade 52 from sliding out.

It is well known that the windshield wiper is an inexpensive product, so that it is unreasonable to utilize any complicate and expensive structure to improve the drawbacks of the conventional windshield wiper as mentioned in the background of the present invention. The present invention successfully provides an additional wiping blade for designated usage without incorporating any extra part and any specific tool during the replacement operation.

Figure 6:
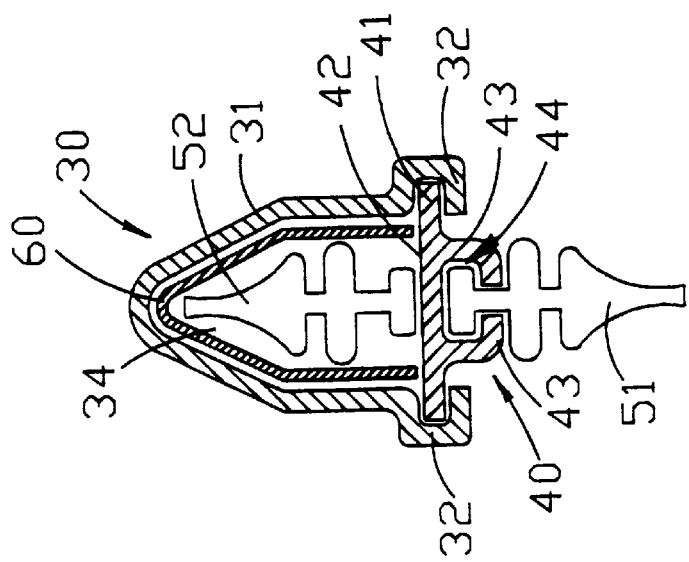
FIG. 6 is a sectional end view of the windshield wiper according to the above second preferred embodiment of the present invention.
Figure 5:
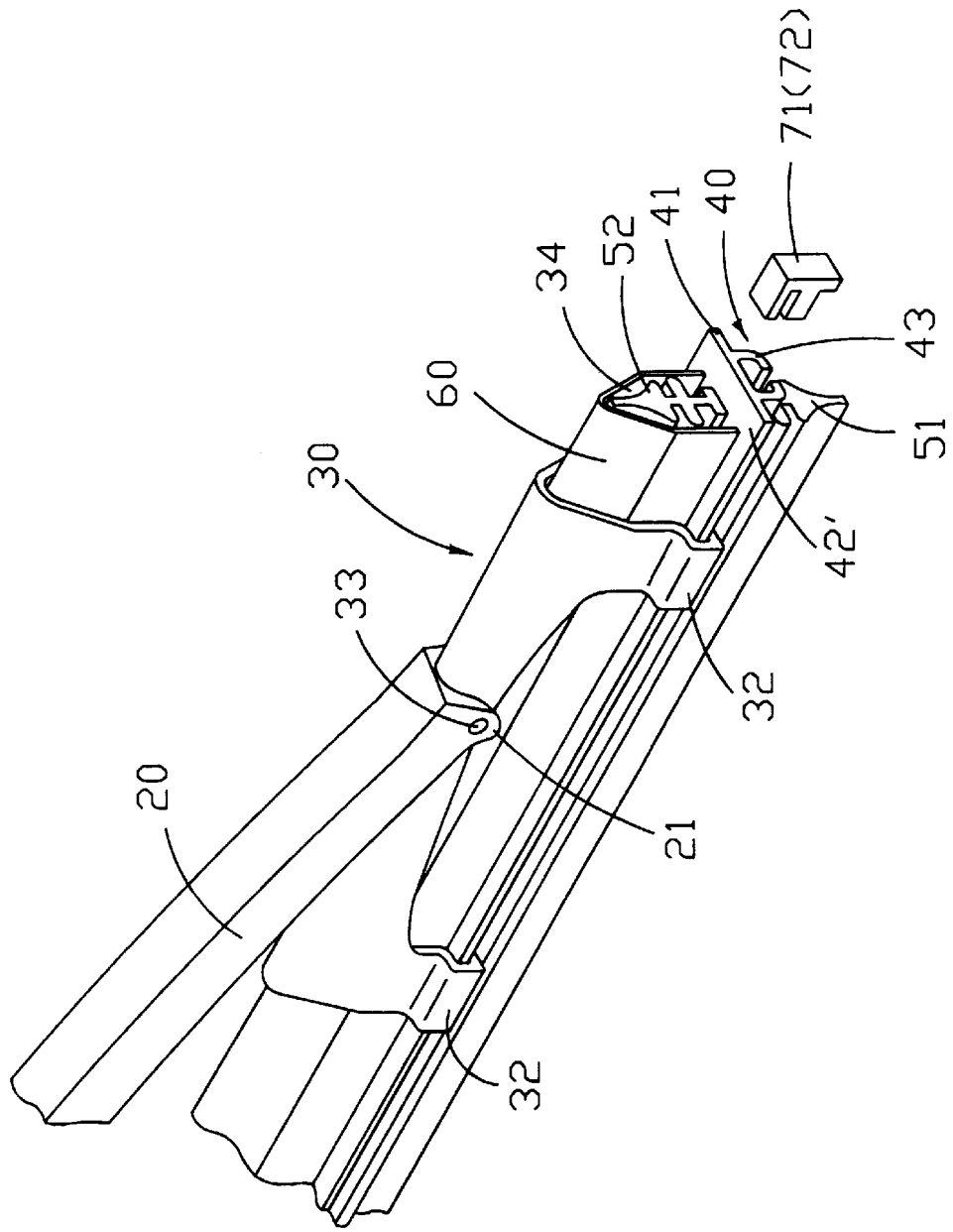
FIG. 5 is a partially enlarged perspective view of a windshield wiper according to a second preferred embodiment of the present invention.

Referring to FIGS. 5 and 6, an alternative mode of the windshield wiper according to a second preferred embodiment of the present invention is illustrated, wherein each of the claw bodies 31 provides a higher height that is equal to the height of the additional wiping blade 52, so that the top surface of the flexor 40 can be a flat surface 42'. Therefore, the additional wiping blade 52 can be stored inside the receiving housing 34 defined by the flat surface 42' and the two U-shaped or V-shaped claw bodies 31.

Moreover, an elongated protective cap 60, which also has a U-shaped or V-shaped cross section and a length equal to the length of the additional wiping blade 52, can be used to cover the additional wiping blade 52 inside the receiving housing 34 for protection. The protective cap 60 is embodied in the second embodiment as an example, as shown in FIGS. 5 and 6, that can be detachably slided inside the receiving housing 34 or firmly connected to the two claw bodies 31 of the pair of claw units 30 to form a protective shell body.

What is claimed is:

1. A windshield wiper, comprising:

a wiper bridge having a predetermined length for pivotally connecting to a windshield wiper arm;

at least two claw units pivotally connected with said wiper bridge respectively, wherein each of said claw units comprises a claw body having a reversed V-shaped cross section and two pairs of U-shaped claws integrally and outwardly extended from two bottom ends of said respective claw body respectively;

an elongated flexor having two side edges which are respectively clamped by said claws of said two claw units so as to firmly mount said flexor extending between said two claw units, said flexor further having an elongated holding groove integrally provided therebelow, wherein said flexor and said two reversed V-shaped claw bodies of said two claw units define a receiving housing;

a wiping blade having an elongated upper head slidably and detachably received in said holding groove of said flexor so as to mount said wiping blade in position;

an additional wiping blade, which is coaxially received in said receiving housing, wherein said additional wiping blade is placed on top of said flexor and held in position by said two reversed V-shaped claw bodies, whereby said user may simply pull out said additional wiping blade and replace said wiping blade by engaging said additional wiping blade with said holding groove of said flexor, and that said replaced wiping blade is capable of storing in said receiving housing, and means for holding said wiping blade and said additional wiping blade in position to prevent from falling out of the holding groove and the receiving housing.

2. A windshield wiper as recited in claim 1 wherein two ends of said wiper bridge each forms a U-shaped end holder for pivotally connected with a middle portion of said respective claw body by a rivet.

3. A windshield wiper as recited in claim 2 wherein each pair of said claws are integrally and outwardly extended from two sides of one end of said respective claw body respectively.

4. A windshield wiper as recited in claim 3 wherein said elongated flexor has an elongated central receiving groove extended along a top surface thereof, and that an elongated upper head of said additional wiping blade is adapted to place along said receiving groove on said top surface of said flexor and be held in position by said two reversed V-shaped claw bodies of said two claw units.

5. A windshield wiper as recited in claim 4 wherein two L-shaped confronting bottom wings are downwardly extended from a bottom surface of said flexor to define said holding groove between said two confronting bottom wings.

6. A windshield wiper as recited in claim 3 wherein two L-shaped confronting bottom wings are downwardly extended from a bottom surface of said flexor to define said holding groove between said two confronting bottom wings.

7. A windshield wiper as recited in claim 6 further comprising an elongated protective cap which has a V-shaped cross section and a length equal to said length of said additional wiping blade, and is slided inside said receiving housing for covering said additional wiping blade stored in said receiving housing for protection.

8. A windshield wiper as recited in claim 3 further comprising an elongated protective cap which has a V-shaped cross section and a length equal to said length of said additional wiping blade, and is slided inside said receiving housing for covering said additional wiping blade stored in said receiving housing for protection.

9. A windshield wiper as recited in claim 2 wherein said elongated flexor has an elongated central receiving groove extended along a top surface thereof, and that an elongated upper head of said additional wiping blade is adapted to place along said receiving groove on said top surface of said flexor and be held in position by said two reversed V-shaped claw bodies of said two claw units.

10. A windshield wiper as recited in claim 2 further comprising an elongated protective cap which has a V-shaped cross section and a length equal to said length of said additional wiping blade, and is slided inside said receiving housing for covering said additional wiping blade stored in said receiving housing for protection.

11. A windshield wiper as recited in claim 1 wherein each pair of said claws are integrally and outwardly extended from two sides of one end of said respective claw body respectively.

12. A windshield wiper as recited in claim 11 wherein said elongated flexor has an elongated central receiving groove extended along a top surface thereof, and that an elongated upper head of said additional wiping blade is adapted to place along said receiving groove on said top surface of said flexor and be held in position by said two reversed V-shaped claw bodies of said two claw units.

13. A windshield wiper as recited in claim 11 further comprising an elongated protective cap which has a V-shaped cross section and a length equal to said length of said additional wiping blade, and is slided inside said receiving housing for covering said additional wiping blade stored in said receiving housing for protection.

14. A windshield wiper as recited in claim 1 wherein said elongated flexor has an elongated central receiving groove extended along a top surface thereof, and that an elongated upper head of said additional wiping blade is adapted to place along said receiving groove on said top surface of said flexor and be held in position by said two reversed V-shaped claw bodies of said two claw units.

15. A windshield wiper as recited in claim 14 wherein two L-shaped confronting bottom wings are downwardly extended from a bottom surface of said flexor to define said holding groove between said two confronting bottom wings.

16. A windshield wiper as recited in claim 1 wherein two L-shaped confronting bottom wings are downwardly extended from a bottom surface of said flexor to define said holding groove between said two confronting bottom wings.

17. A windshield wiper as recited in claim 16 further comprising an elongated protective cap which has a V-shaped cross section and a length equal to said length of said additional wiping blade, and is slided inside said receiving housing for covering said additional wiping blade stored in said receiving housing for protection.

18. A windshield wiper as recited in claim 1 further comprising an elongated protective cap which has a V-shaped cross section and a length equal to said length of said additional wiping blade, and is slided inside said receiving housing for covering said additional wiping blade stored in said receiving housing for protection.

* * * * *